Sept. 23, 1969  C. V. MUFFOLETTO  3,468,610
SCHLIEREN AND STRAIN BIREFRINGENCE SYSTEM
Filed May 10, 1966

CARL VERNE MUFFOLETTO
INVENTOR

BY Walter G. Finch
ATTORNEY

United States Patent Office 3,468,610
Patented Sept. 23, 1969

3,468,610
SCHLIEREN AND STRAIN BIREFRINGENCE SYSTEM
Carl Verne Muffoletto, 6100 Everall Ave., Baltimore, Md. 21206
Filed May 10, 1966, Ser. No. 548,886
Int. Cl. G01n 21/46, 1/10
U.S. Cl. 356—129                                                 1 Claim

ABSTRACT OF THE DISCLOSURE

An optical testing instrument is shown and described which comprises a tubular light shield within which a sample of transparent material to be examined is placed. One end of the shield is closed and has a spherical front surface mirror which faces toward the opposite open end. The open end has a lamp housing which is arranged to provide a pin point or slit light source which illuminates the spherical mirror through the sample. The reflected light, passing back again through the sample, comes to a focus of the image of the pin hole or slit upon a knife edge adjacent the lamp house. An eye piece which may be open or with a magnifying telescope gives the operator a Schlieren shadow view of the brightly illuminated sample against a large dark field or background. The knife edge is retractable and the pinhole may be changed in size. In this manner with a rotatable analyzer replacing the eyepiece and a polarizer in the path of light from the source of the instrument becomes a large field strain birefringence examining device showing fringe patterns in strained samples.

---

This invention relates generally to optical testing instruments, and more particularly it pertains to a shadowgraph and polarizing arrangement for determining the homogeneity and strain birefringence of a transparent object.

Often it is desirable to examine a lens blank, window, block or any transparent object solid, or liquid, for quality of optical structure. The presence of twining, strains, stir marks, and other departure from uniformity precludes the construction of high quality lenses from such solid objects. Further, such examination of liquids and biological specimens for miscibility often leads to insight as to their structure in a manner not attainable otherwise.

It is an object of this invention to provide an instrument and associated apparatus which will subject a transparent object to Schlieren and strain birefringence examination in a relative simple and direct manner.

Another object of the invention is to provide an optical structure for viewing of objects in an instrument having a wide field of view.

Other objects and advantages of the invention will become more readily apparent and understood from the following detailed specification and single sheet of accompanying drawings in which.

Figure 2:
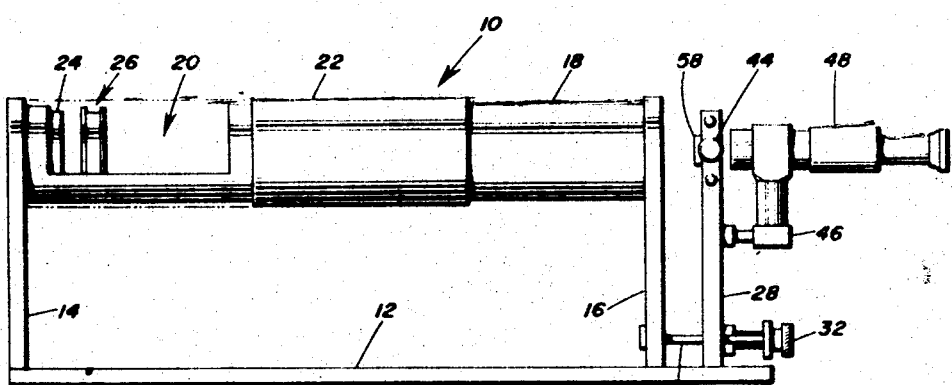
FIG. 2 is a side elevation of an instrument incorporating features of this invention.
Figure 3:
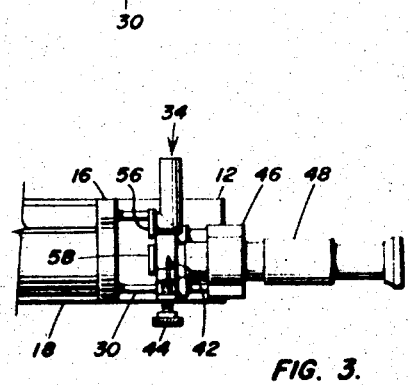
FIG. 3 is a plan view of the right end of the instrument of FIG. 2.

Referring now to the details of the drawings as shown in FIGS. 2 and 3, this invention consists of an instrument 10 having a base 12 which mounts a light shield tube 18 on spaced end plates 14 and 16 at some convenient height for viewing thereinto by an operator. One end of tube 18 is provided with a deep wide slot 20 which may be covered by sliding thereover a sleeve 22 positioned on the tube 18.

This end of the tube 18 is closed and contains a perfect spherical concave front surface mirror 24 whose optical axis extends down the tube. A sample 26, which may be a lens blank of glass, plastic, quartz or other transparent material, is placed close to the mirror 24 in tube 18 through slot 20 and the sleeve 22 closed thereover.

A movable plate 28 on ways or guide rods 30 is positioned in front of the open other end of tube 18 and is arranged to be adjustably positioned relatively thereto by a focusing adjustment element 32. This plate 28 mounts a lamp housing 34 preferably positioned off to one side but arranged with a prism or front surface mirror 40 to "look" into the tube 18. The lamp housing 34 is provided with a slit or a pinhole 35 which is illuminated by a light source 36, and, if desired, with the aid of a condenser 38.

Figure 1:
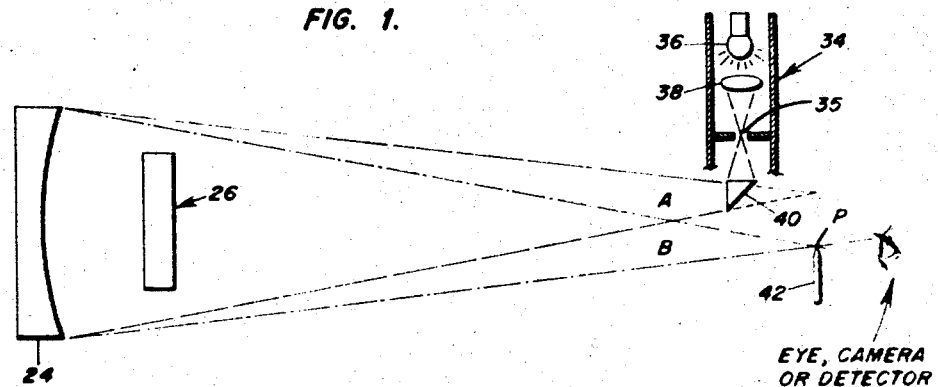
FIG. 1 is a schematic optical diagram of a Schlieren and strain birefringence object examining instrument.

The image of the slit or pinhole 35 directed down the tube 18 is reflected and focused by the concave mirror 24 upon a knife edge 42 mounted on plate 28. An adjustment screw 44 advances or retracts this knife edge 42 sideways into or out of this focus point P. The eye of the operator may be positioned just back of point P as shown in FIG. 1 so as to view the sample 26 directly past the knife edge 42 or he may view through a telescope 48 on a removable platform 46 located here to assist in examining small anomaly details in the sample.

Figure 4:
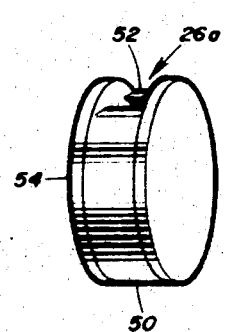
FIG. 4 is a spherical absorption cell for use with the instrument when viewing liquids or biological specimens.

The eye of the operator views a large dark background with the entire sample appearing lighted and exhibiting Schlieren shadow patterns, if any. For example, stir marks in the glass melt or poorly fluidized fragments of glass or crystals of quartz are readily seen. Star flaws, perhaps incipient fracture areas, are also discernible.

Where liquid samples or biological specimens are to be examined with this instrument 10, a sample holder 26a, shown in FIG. 4, is used. A cylindrical section 50 with perfectly parallel ends is wrung onto a pair of end plates 54 having accurately parallel faces. A gap 52 in the section 50 allows introduction of the sample liquid and examination proceeds as with a solid sample 26.

Conversion of the instrument 10 to a large field strain birefringence device is done by retracting the knife edge 42 from the field of view. A larger pinhole 35 is used and a polarizer 56 placed in the path of the in-going light, as shown at A in FIG. 1. A rotatable analyzer 58 before the eye in the out-going light, shown at B in FIG. 1, is then adjusted to near extinguishment of light whereupon fringe patterns appear in the sample if it has strains.

The use of a filtered light source of monochromatic light as from a discharge tube or a laser will give an achromatic imaging if desired for more definition.

Obviously many modifications and variations of the present invention are possible in light of the above teachings. It is, therefore, to be understood that within the scope of the appended claims the invention may be practiced otherwise than as specifically described.

What is claimed is:
1. A Schlieren optical testing device system, comprising, a pair of parallel spaced support members, means including a cylindrical light shield tube mounted between and affixed to said parallel spaced members and having adjacent one end thereof a slot formed therein for receiving and for positioning by the cylindrical interior of the tube a cylindrical optical sample to be analyzed, closure means including a cylindrical sleeve member mounted on said tube and movable longitudinally of said tube over said slot to cover said sample being analyzed, means including a spherical concave front surface mirror positioned adjacent said slot in said tube and arranged for closing off said one end of said tube, with the optical axis of said front surface mirror extending down said tube toward the open end of said tube, light source means, prism means positioned adjacent the open end of said tube for projecting an image of said source of light down said tube through an optical sample to be analyzed to said concave mirror, means including a knife edge connectedly positioned externally of said tube and laterally spaced from said image of said light source being propjected down said tube, with said light image of said source being reflected and focused back to said knife edge by said concave mirror, and a removable sample holder positioned in the interior of the said light shield tube comprising a cylindrical section of tube with parallel ends and a pair of transparent end-plates having parallel faces, the said end-plates being affixed respectively to parallel ends of the cylindrical section, thereby forming an enclosure with transparent windows for examination of liquid samples and the like in the said system.

References Cited

UNITED STATES PATENTS

| | | |
|---|---|---|
| 696,371 | 3/1902 | Graae. |
| 2,541,437 | 2/1951 | Prescott. |
| 3,045,531 | 7/1962 | Prescott _____ 88—14 |

OTHER REFERENCES

Holder, D. W. and North, R. J.: "Schlieren Methods- Notes on Applied Science No. 31," (London) 1963, National Physical Laboratory, pp. 26 and 33 relied upon. QC373S3H6.

An article from: Scientific American Supplement, No. 741, March 15, 1890, p. 11838.

JEWELL H. PEDERSEN, Primary Examiner

T. MAJOR, Assistant Examiner

U.S. Cl. X.R.

356—246